July 3, 1962
A. M. THOMSEN
3,042,492
METHOD OF MAKING TITANIUM DIOXIDE
Filed Oct. 26, 1959
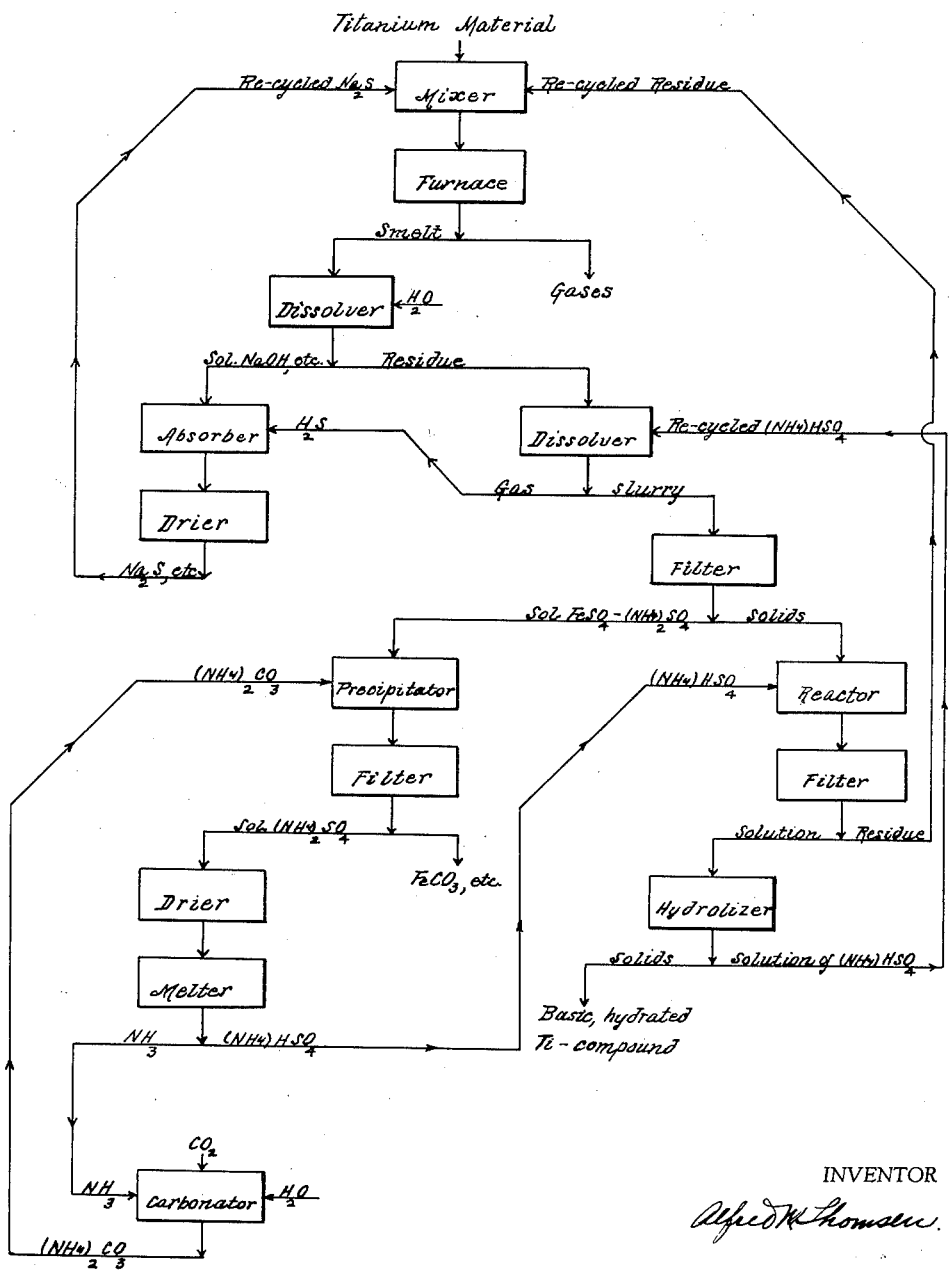
INVENTOR
Alfred M. Thomsen.

3,042,492
METHOD OF MAKING TITANIUM DIOXIDE
Alfred M. Thomsen, 265 Buckingham Way, Apt. 402, San Francisco 27, Calif.
Filed Oct. 26, 1959, Ser. No. 848,706
3 Claims. (Cl. 23—202)

This is a continuation-in-part of previous application, now abandoned, bearing the same title with the Ser. No. 628,487, filed December 17, 1956. The essential items of the instant application are the ways and means whereby the present heavy outlay or chemicals is greatly minimized and the cost of disposal of waste products is entirely solved. As a further item it also permits the greatest latitude in the selection of raw materials. Today that may be said to consist almost entirely of a mineral, ilmenite, but such complex mixtures as unseparated "black sand concentrates" or titaniferous slags that are unattacked by sulphuric acid become entirely acceptable.

In the drawing, which is attached hereto and made a part hereof, I have used as a generic name "titanium material" to denote any such source of titanium as I cannot conceive of any material that would not be adaptable though, manifestly, the economic status might be unacceptable. The aim and object of my process is not so much to produce, at once, a marketable product but rather to obtain a purified form of titanium which shall be very reactive when used in a subsequent operation. It will be obvious, however, that if sufficient care be taken an acceptable product might be produced at once, and if so I regard it as within the limits of my disclosure. My process is best understood by following the steps indicated on the drawing and I will accompany my description of same with such explanatory language as may seem appropriate, so that any skilled operator can easily duplicate my results.

As a preamble I wish to state that no chemical reaction used herein is considered as being original. All such material is manifestly old and in use elsewhere in industry. I do believe, however, that the combination of these reactions in the manner and for the purpose attained herein is not only new and original but also of high service to the titanium industry when and if it should become common practice.

I commence with a smelting step. The raw material is commingled with enough sodium sulphide to make an easy melting mixture. In view of the latitude I cannot specify a direct proportion unless I also specify a known mineral so, calling this a specific application, my preferred version is to point out the invention, I will choose an ilmenite with a titanium dioxide content of about 50%. Such material fuses with the same weight of sodium sulphide to make a free-running slag. However, as previously stated, I assume that one merit of my process is the use of far more complex material than ilmenite, the chief ingredient of which, next to the titanium is iron, with small amounts of chromium, vanadium, aluminum, magnesium and manganese.

In the drawing I have shown this slag treated with water in the dissolver. In practice I prefer to actually run the slag or "smelt" from the furnace into agitated water thus forming a slurry which then goes to the filter. The dissolved material will be largely sodium hydroxide, the solids iron and other metallic sulphides commingled with a basic hydrated form of titanium oxide. I have then shown these solids treated with a solution of ammonium bisulphate in the next "dissolver" to dissolve the metallic sulphides previously referred to and to leave a residue that is essentially a basic titanium compound. Obviously the amount of bisulphate required is in excess of the stoichiometric demand and I recommend a final acidity before filtration of about a pH of 2. In this reaction hydrogen sulphide is evolved and I have shown this as absorbed in the filtrate from the water treatment of the "smelt" which I have described as "largely sodium hydroxide." Obviously, this regenerates said sodium sulphide so I have shown it dehydrated in a drier and recycled to the mixer so as to serve once more in the fusion step.

It is, of course, unavoidable that there is some loss of sodium sulphide which must be made up periodically but the main amount is consistently recycled. The solids from this bisulphate reaction consist of a highly reactive, much purified titanium residue which is too impure for any direct use but which dissolves readily in a much stronger attack with a large excess of bisulphate in the device called a "reactor" on the drawing. It should be used in such an amount and at such a concentration that about 85% of the resident titanium is dissolved. The undissolved portion, separated on the filter, is shown as recycled to the mixer which in turn feeds the furnace. Such material is probably a rutile present in micro condition within the ilmenite crystal. In conventional practice it would be lost but if recycled it will ultimately appear in the dissolved fraction which was separated from said residue thus rendering the yield approximately quantitative.

The solution of titanium in the ammonium bisulphate solution is next hydrolyzed by partial neutralization and long continue heating until at least 95% of the resident titanium has been precipitated. It is then shown as filtered yielding a highly purified reactive titanium product still retaining both sulphuric acid and ammonia though not present as ammonium sulphate. In general it will yield 75% of its weight as $TiO_2$ if calcined. However, it will rarely be good enough for this purpose though if commingled with a little, say 5% of $TiCl_3$, or its equivalent in any other titanium salt, the whiteness and purity will be much enhanced. As previously emphasized, however, I regard it as prime raw material for some other finishing step.

So far I have paid no attention to the iron sulphate solution obtained when the sulphides were treated with ammonium bisulphate. On the drawing I show this precipitated by ammonium carbonate thus producing a slurry of ferrous carbonate and a solution of ammonium sulphate. I next show separation by filtration and dehydration in the following drier, thus obtaining ammonium sulphate prepared for the "melter." In this device, which functions at temperatures as low as 350° C., said ammonium sulphate is decomposed into the bisulphate with evolution of ammonia gas.

At the bottom of the drawing I have indicated a "carbonator" which may be merely a coke packed scrubber. In this device the ammonia evolved in the last mentioned step is commingled with carbon dioxide and water to form a solution of ammonium carbonate, which in turn is recycled to the ferrous carbonate precipitation step. This entire procedure is so archaic that no particular instruction is needed, save to comment that an excess of ammonium carbonate is called for in the precipitation. As little as 5% excess will serve to render precipitation practically complete. The reaction is best carried out on a continuous basis by permitting the ammonium carbonate solution and the ferrous sulphate solution, respectively, to flow into a large agitated tank in substantially the correct proportion and then to govern the excess of ammonium carbonate as previously indicated. In this manner the ferrous carbonate will be obtained in relatively coarse particle size making easy filtering on any type of continuous filter. A very small amount of iron will remain in the ammonium sulphate solution due to its solubility in said menstruum but such an amount is innocuous in all subsequent operations.

In résumé it may be said that the aim and object I have accomplished is to operate with recycled ammonium bisulphate as the acid medium and similarly recycled ammonium carbonate as the alkaline medium, thus avoiding the cost of chemicals, save such as is due to unavoidable losses, and obtaining the iron in solid form, as ferrous carbonate, which will constitute a valuable by-product. To make this concept feasible it is essential that the initial step of fusion with sodium sulphide be included. As a corollary this mandatory fusion step also makes possible the use of many types of titanium containing material not considered useful at the present stage of the industry.

Having thus fully described my process, I claim:

1. The method of manufacturing a partially purified, highly reactive, basic oxy-compound of titanium from titaniferous material, containing as impurities other metallic compounds besides titanium, which comprises; commingling said titaniferous material with sodium sulphide in sufficient amount to form a readily fusible mixture and fusing said mixture, thus converting it into a mixture of sodium titanates and sulphides of the metallic impurities present therein; commingling said fused product with water to obtain a solution of sodium compounds, essentially sodium hydroxide, while an insoluble mixture of metallic sulphides and titanates remains as an undissolved residue; separating said solution from said residue and reserving both for subsequent treatment; commingling said residue with a solution of ammonium bisulphate, thus decomposing the metallic sulphides present therein with the formation of the corresponding metallic sulphates and with attendant evolution of hydrogen sulphide gas; absorbing said gas in the reserved solution of sodium compounds consisting essentially of sodium hydroxide, thus converting said hydroxide to sodium sulphide; dehydrating said solution of sodium sulphide and recycling it to the fusion step as the sodium sulphide specified therein; separating the reaction product of ammonium bisulphate with metallic sulphides and titanates, previously described, into a soluble and an insoluble portion, the soluble portion being essentially metallic sulphates and ammonium sulphate, the insoluble portion being essentially a partially purified basic oxy-compound of titanium; commingling the soluble portion with ammonium carbonate in sufficient amount to precipitate the metallic sulphates present therein as the corresponding carbonates, the ammonium carbonate being simultaneously converted into ammonium sulphate; separating the precipitate thus produced; dehydrating the resulting solution, consisting essentially of ammonium sulphate, and heating same to produce gaseous ammonia and ammonium bisulphate; converting said ammonia into ammonium carbonate for subsequent recycling to the step where ammonium carbonate is prescribed; recycling said ammonium bisulphate to that step wherein metallic sulphides are decomposed with ammonium bisulphate, with evolution of hydrogen sulphide gas, as the ammonium bisulphate prescribed therein.

2. The method of making a partially purified, highly reactive oxy-compound of titanium, set forth in claim 1; with the added step of commingling said compound with a solution of ammonium bisulphate, in such strength and in such amount that approximately 85% dissolves; separating the insoluble portion and hydrolizing the resultant solution to obtain a still further purified oxy-compound of titanium.

3. The method of manufacturing a purified, highly reactive, basic oxy-compound of titanium set forth in claim 2, with the added step that a trivalent salt of titanium be commingled with the titanium containing solution being hydrolyzed therein, previous to said hydrolysis, thus inhibiting oxidation during said hydrolysis and yielding a purer final product.

References Cited in the file of this patent

UNITED STATES PATENTS

| | | |
|---|---|---|
| 1,106,410 | Rossi et al. | Aug. 11, 1914 |
| 1,206,798 | Barton | Dec. 5, 1916 |
| 1,995,334 | Svendsen | Mar. 26, 1935 |
| 2,775,508 | Thomsen | Dec. 25, 1958 |

OTHER REFERENCES

Mellor, "A Comprehensive Treatise on Inorganic and Theoretical Chemistry," Vol. 2, (1922) pages 701–702, Longmans, Green and Co.

Jocobson, "Encyclopedia of Chemical Reactions," vol. VII, (1958), page 99, Reinhold Publ. Co.